United States Patent
Gans (10) Patent No.: US 8,200,188 B2
(45) Date of Patent: Jun. 12, 2012

(54) SYSTEM AND METHOD FOR ADAPTIVE FAIR USAGE CONTROLS IN WIRELESS NETWORKS

(75) Inventor: Edwin Gans, Ottawa (CA)

(73) Assignee: Bridgewater Systems Corp., Ottawa (CA)

( * ) Notice: Subject to any disclaimer, the term of this patent is extended or adjusted under 35 U.S.C. 154(b) by 481 days.

(21) Appl. No.: 12/389,818

(22) Filed: Feb. 20, 2009

(65) Prior Publication Data

US 2010/0216424 A1 Aug. 26, 2010

(51) Int. Cl.
*H04M 11/00* (2006.01)
(52) U.S. Cl. ........ 455/405; 455/453; 379/111; 709/224; 705/52; 370/230
(58) Field of Classification Search .......... 455/405, 455/410, 411, 452.2, 453; 379/11, 112.04–112.1, 379/114.14, 127.02; 709/224–226; 370/230, 370/232, 235, 450
See application file for complete search history.

(56) References Cited

U.S. PATENT DOCUMENTS

| | | | |
|---|---|---|---|
| 6,459,902 B1 * | 10/2002 | Li et al. | 455/453 |
| 6,718,393 B1 * | 4/2004 | Aditya | 709/239 |
| 6,721,284 B1 * | 4/2004 | Mottishaw et al. | 370/255 |
| 7,047,312 B1 | 5/2006 | Aweya et al. | |
| 7,113,990 B2 * | 9/2006 | Scifres et al. | 709/224 |
| 7,352,850 B1 * | 4/2008 | Cericola et al. | 379/112.05 |
| 7,545,761 B1 * | 6/2009 | Kalbag | 370/310 |
| 7,603,102 B1 * | 10/2009 | Pryor | 455/406 |
| 7,774,842 B2 * | 8/2010 | Mahone et al. | 726/22 |
| 7,958,238 B1 * | 6/2011 | Batz et al. | 709/225 |
| 2003/0088511 A1 * | 5/2003 | Karboulonis et al. | 705/39 |
| 2004/0047324 A1 | 3/2004 | Diener | |
| 2006/0045245 A1 * | 3/2006 | Aaron et al. | 379/111 |
| 2007/0206546 A1 * | 9/2007 | Alberth et al. | 370/338 |
| 2007/0217335 A1 * | 9/2007 | Jayaraman et al. | 370/235 |
| 2007/0226332 A1 * | 9/2007 | Becker-Szendy et al. | 709/224 |
| 2008/0095148 A1 * | 4/2008 | Hegde | 370/360 |
| 2010/0022216 A1 * | 1/2010 | Bandera et al. | 455/405 |
| 2010/0082603 A1 * | 4/2010 | Krompass et al. | 707/719 |

FOREIGN PATENT DOCUMENTS

WO WO 01/25877 A2 4/2001

OTHER PUBLICATIONS

International Search Report from the United States Patent and Trademark Office for International Application No. PCT/IB2010/000478, dated Jul. 8, 2010.
Written Opinion from the United States Patent and Trademark Office for International Application No. PCT/IB2010/000478, dated Jul. 8, 2010.

* cited by examiner

*Primary Examiner* — Kamran Afshar
*Assistant Examiner* — Gerald Oliver
(74) *Attorney, Agent, or Firm* — Zilka-Kotab, PC (57) ABSTRACT

A system and method to determine excessive usage across a base station coverage region for the purpose of ensuring fair usage for all wireless data subscribers. During a configurable time window, subscriber usage is monitored. Subscriber usage above a threshold level is deemed excessive and triggers an operator-defined business rule. Based on the business rule, the subscriber's service may be reduced. The system and method adapts to the number of subscribers within the base station coverage region when making an excessive usage determination. This approach enables bursty data protocols to be fully supported, while detecting excessive usage patterns.

21 Claims, 4 Drawing Sheets

SYSTEM AND METHOD FOR ADAPTIVE FAIR USAGE CONTROLS IN WIRELESS NETWORKS

BACKGROUND OF THE INVENTION

1. Field of the Invention

The present invention relates generally to data communications networks, and specifically to control of subscriber usage in wireless networks.

2. Background Art

An increasingly large number of individuals use portable computing devices, such as laptop computers, personal data assistants (PDAs), smart phones and the like, to support mobile communications. The number of computing devices, and the volume of data communicated, has increased dramatically in recent years. Market studies have concluded that this trend of ever-increasing demands for data communication coupled with subscribers seeking expanded mobility will continue for quite some time.

As telecommunications technology continues to evolve to meet this ever increasing demand, service providers continue to make investments in state-of-the-art technology in order to remain at the forefront of offerings in the marketplace. However, in order to maximize the experience of their subscriber base, service providers are constantly challenged to ensure trouble-free support for the modern wireless data communications protocols, while limiting subscribers who consume excessive bandwidth at the expense of other subscribers.

In 3G data communications networks, subscribers are typically provided with a high bandwidth limit to ensure that the bursty nature of the current generation of data communication protocols is fully supported. An engineering assumption made by wireless service providers is that users infrequently reach this high limit. However, some subscribers are exploiting this high bandwidth setting and are continuously using the service at the high bandwidth limit. These subscribers are considered to be abusing the wireless communications system. Because there is an overall bandwidth limit in any given geographical coverage area, continuous usage at an excessive level by certain subscribers reduces the available bandwidth for the rest of the subscriber base. The net result is a diminished experience for the vast majority of subscribers. Although the number of subscribers who are guilty of excessive usage is currently few, their numbers are expected to grow significantly in the near term, and pose a significant challenge to communications network providers.

Although excessive usage often results from the use of certain types of applications, the use of deep packet inspection (DPI) techniques to identify such excessive usage is considered by the Federal Communications Commission to be discriminatory, and therefore not acceptable. Accordingly, identification of such excessive use must be approached at the level of usage metrics, rather than through an evaluation of the data content being communicated. Moreover, any attempt to deal with the problem of excessive usage by certain subscribers must also take into account the real-time usage information of the network. If such information was not taken into account, some subscribers would potentially face a service reduction without any compensating benefit being made available to other subscribers.

Another approach to solving the excessive usage issue is to use network controls to configure the maximum bit rate permissible. Since network controls are distributed across the network, such an approach would be highly scalable. However, such network controls lack subscriber state information. Consequently, this network control approach is unable to adapt based on different subscriber usage situations, e.g., prior subscriber usage within a given session, prior subscriber usage during a prior session, or subscriber usage during a current billing period.

What is therefore needed is a sophisticated technique for monitoring current and/or prior subscriber data usage of a communications network to identify excessive usage warranting corrective action by the communications data operator.

BRIEF SUMMARY OF THE INVENTION

In an embodiment of the present invention, an adaptive fair usage module calculates the usage by a subscriber in a base station coverage area and determines whether the usage is excessive by comparison with a fair usage threshold value.

In various embodiments of the present invention, excessive usage triggers a business rule that is configurable by the communications service provider. In the case of one business rule, the service bandwidth provided to the subscriber with the excessive usage is reduced. Other business rules that can be configured include redirection to the top-up portal, disconnection from the communications network, and forwarding to marketing for a subsequent solicitation.

In a further embodiment of the present invention, an adaptive fair usage module uses subscriber state information in conjunction with business rules to determine the outcome when excessive usage has been detected. Subscriber state information includes information such as prior usage of the subscriber within a given session, usage of the subscriber from a previous session, and/or usage of the subscriber within a current billing period.

In another embodiment of the present invention, the adaptive fair usage module adapts its fair usage threshold value calculation to the actual load conditions by being responsive to the number of active subscribers occupying a particular base station coverage area.

Further embodiments, features, and advantages of the invention, as well as the structure and operation of the various embodiments of the invention are described in detail below with reference to accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

Figure 1:
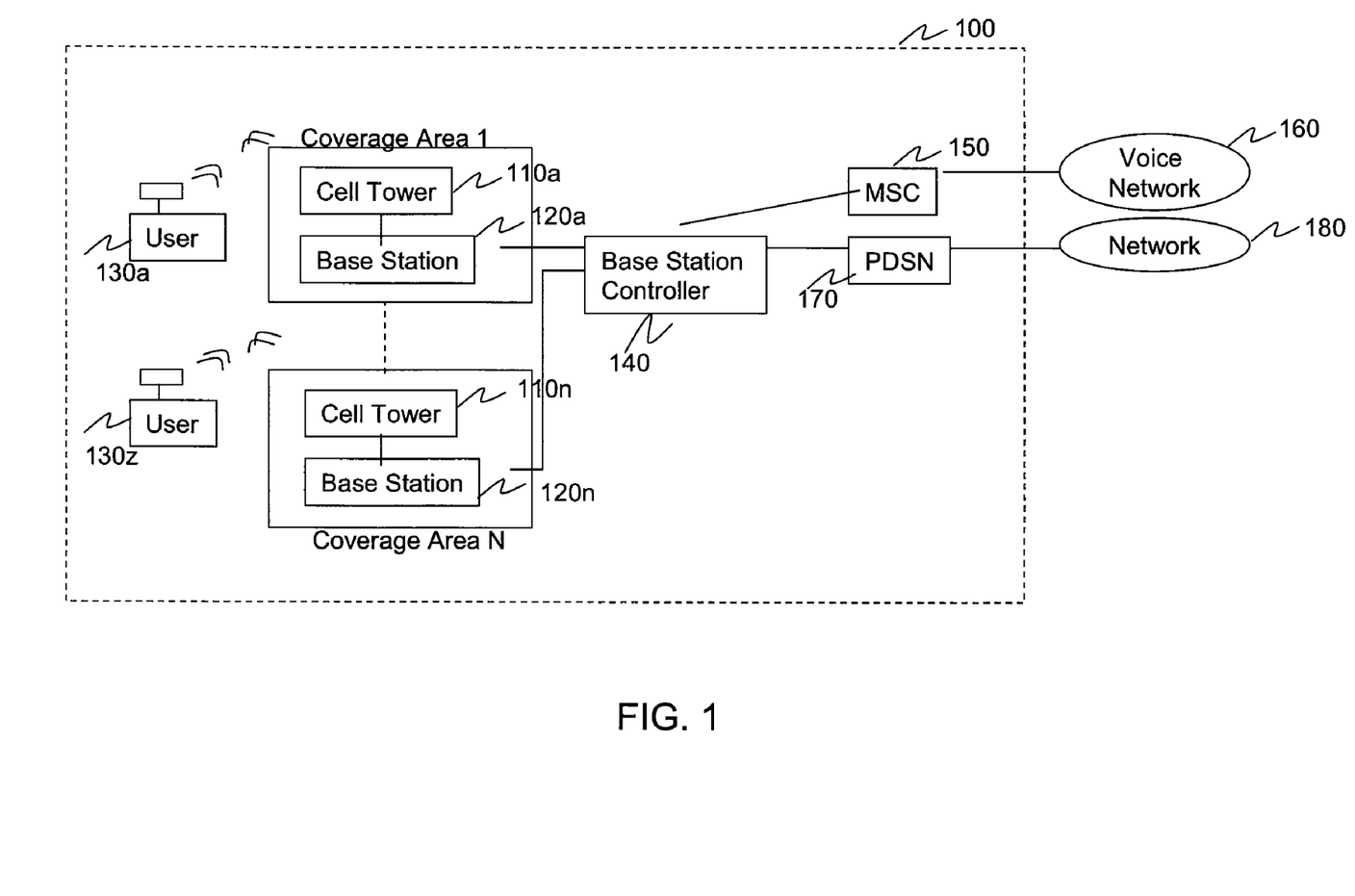
FIG. 1 depicts a conventional cellular network that provides data services to its subscribers.

FIG. 1 depicts a conventional wireless network 100 with data service provision capabilities for its mobile subscribers 130a through 130z. The wireless network 100 includes multiple cell towers 110a through 110n that are co-located with their respective base stations 120a through 120n. A cluster of base stations 120a through 120n are controlled by a base station controller 140. As would be appreciated by a person of skill in the art, a typical wireless network includes more than one base station controller, with each base station controller managing its own separate cluster of base stations.

For voice traffic, the base station controller 140 is connected to the voice network 160 via a mobile switching center (MSC) 150. For data traffic, the base station controller 140 is connected to a network 180 via a packet data switched network (PDSN) 170. In this environment, a mobile subscriber 130 may be using some form of data device, including but not limited to a laptop computer, personal data assistant (PDA), or smart phone. Network 180 may be a private data network, a public data network (e.g., the Internet), or a combination of both.

As can be seen in FIG. 1, the wireless network 100 provides the connection between the mobile subscribers 130 and network 180. The wireless network 100 is operated by a wireless operator who has a relationship with the mobile subscribers 130 to use the data communications services provided by the wireless network 100. The relationship typically establishes a set of service criteria such as the data rate that will be made available to and from the mobile subscriber 130 by the wireless network.

The type of established relationship may be a direct relationship between the wireless operator and the mobile subscriber 130, or it may be an indirect relationship between the mobile subscriber 130 and the wireless operator by virtue of roaming privileges. Roaming privileges exist when a mobile subscriber 130 has a relationship with a second wireless operator, who in turn has a relationship with the wireless operator in whose coverage area that the mobile subscriber 130 is located when the data service is invoked.

Still referring to FIG. 1, each base station 120 covers a particular geographical coverage area or cell. In addition, each base station 120 also provides the radio link protocols with the mobile subscriber 130. The base station controller 140 connected to the particular base station 120 manages the radio resources used in the radio link to the mobile subscriber 130. In particular, the base station controller 140 manages the radio channel setup to support the communication with the mobile subscriber. As mobile subscribers 130 travel from one geographical coverage area to another, the base station controller 140 manages the handover necessary to ensure uninterrupted communication with the mobile subscriber 130.

As noted above, each base station 120 provides the radio link protocol for data communication with the mobile subscriber 130. In many wireless data networks, radio link protocols are typically 3G (third generation) protocols. 3G protocols provide high-speed data transmissions of 144 kbps and higher. At such data rates, 3G protocols can support multimedia applications such as full-motion video, video conferencing and Internet access. However, the nature of these protocols is such that the instantaneous bit rates of these protocols are "bursty" (e.g., the instantaneous bandwidth required for distortion-free transmission using the particular protocol exceeds that of the average bandwidth needed to support the protocol). As such, many carriers apply the design requirement that the network be capable of supporting the instantaneous peak bit data rates, although the average bit data rates are lower. The differential between the engineering requirement for networks to support the higher instantaneous bandwidth requirements of bursty protocols, and the planning assumption that the average subscriber has more modest average usage rates creates the opportunity for excessive usage rates to be exploited by individuals.

Figure 2:
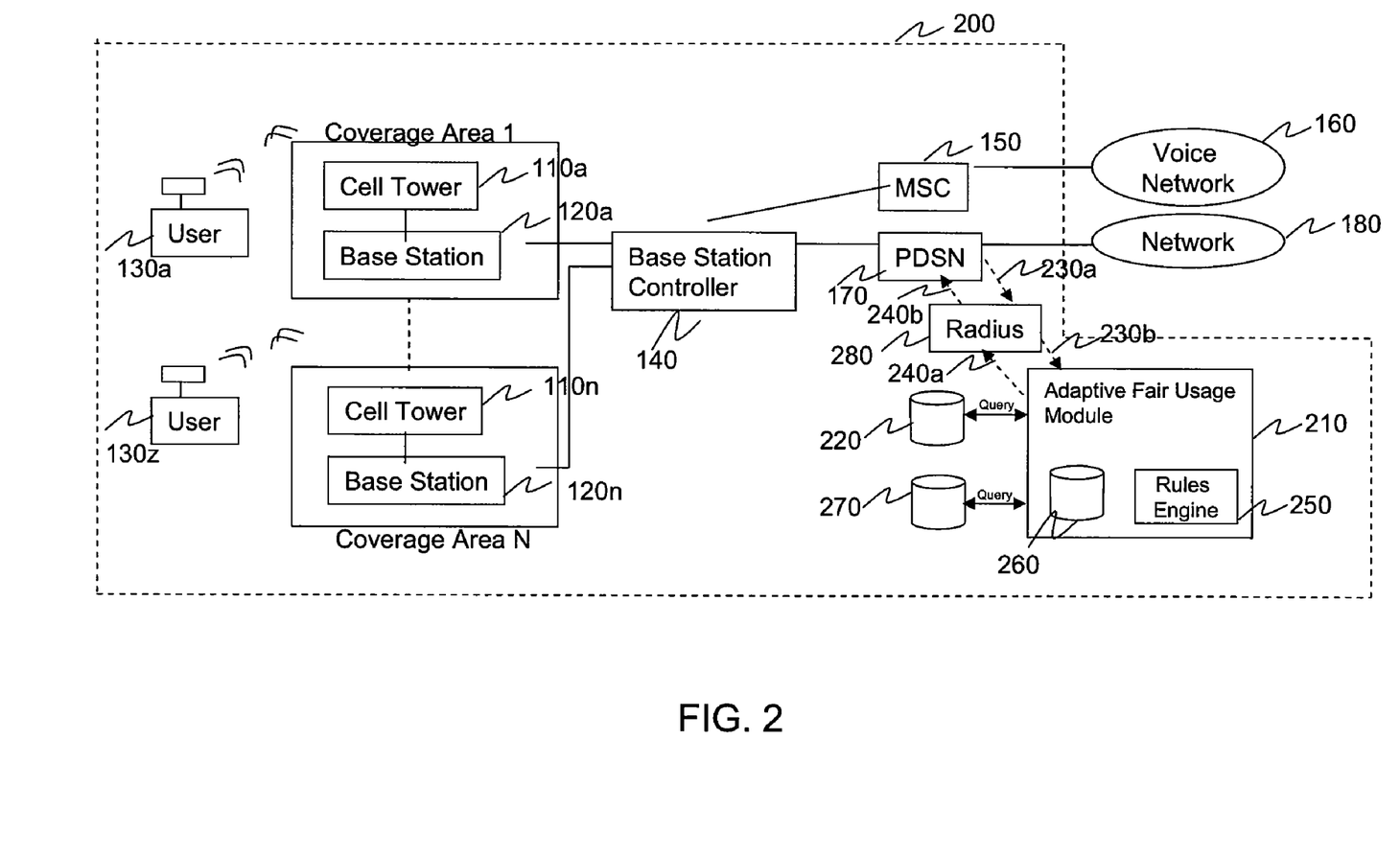
FIG. 2 depicts a block diagram of an operating environment with an adaptive fair usage control for cellular networks, according to embodiments of the present invention.

FIG. 2 depicts a block diagram of a wireless data network 200. Wireless data network 200 includes multiple cell towers 110a through 110n, base stations 120a through 120n, base station controller 140, and mobile switching center 150, as shown earlier in FIG. 1. Wireless data network 200 also includes an adaptive fair usage module 210, a subscriber session state repository 220, a subscriber profile repository 270, and optionally a RADIUS server 280, according to embodiments of the present invention. Adaptive fair usage module 210 includes a rules engine 250 and a subscriber state repository 260. Subscriber session state repository 220, subscriber state repository 260 and subscriber profile repository 270 may use any media to store the information, including disk and random access memory (RAM). The adaptive fair usage module 210 is connected (either directly or indirectly) to the PDSN 170, to subscriber profile repository 270, and to a subscriber session state repository 220. Messages containing accounting information and authorization levels are exchanged between the adaptive fair usage module 210 and the PDSN 170. Optionally, a RADIUS server 280 or its equivalent is used as an intermediary such that RADIUS (or equivalent) messages may be exchanged with PDSN 170, while proprietary communications may be used between RADIUS server 280 and adaptive fair usage module 210. Messages 230a are forwarded by PDSN 170 to RADIUS server 280, which in turn forwards the information contained in messages 230a to adaptive fair usage module 210 using messages 230b. Similarly, messages 240a are forwarded by adaptive fair usage module 210 to RADIUS server 280, which in turn forwards the information contained in messages 240a to PDSN 170 using messages 240b.

Subscriber session state repository 220 includes user session information such as the base station ID information that is associated with each mobile subscriber at any particular instant in time. Subscriber session state repository 220 also includes information such as time of attachment, carrier ID, user login name, network access server (gateway) address, and correlation ID (to correlate accounting messages of a roaming subscriber). Subscriber session state repository 220 may also include the number of active mobile subscribers in a given geographical coverage area.

Subscriber profile repository 270 includes subscriber attributes unrelated to specific session usage data associated with each subscriber. For example, subscriber profile repository 270 includes subscriber information known at the provisioning stage such as subscriber identification attributes, and level of subscriber service (i.e., basic, premium, etc.) In scenarios where the permissible fair usage by each subscriber is statically prescribed at the provisioning stage, the prescribed fair usage threshold value is stored in subscriber profile repository 270.

Adaptive fair usage module 210 is configured to identify excessive usage and to take corrective action when excessive usage by a subscriber is identified. The corrective action is determined by business rules stored in rules engine 250. Such corrective action may be to simply log excessive usage in subscriber state repository 260 for later analysis.

As noted above, adaptive fair usage module 210 includes rules engine 250, which stores and executes business rules. A business rule may be configurable by the wireless operator. Business rules may be customized on a per-subscriber basis, although for simplicity, wireless operators typically cater to various classes of subscribers (e.g., premium, basic, etc.) and develop business rules to match those classes of subscribers. Exemplary business rules include alerting the mobile subscriber to the excessive usage, taking action against the mobile subscriber, or both. For example, a corrective action may be to reduce the bandwidth made available to the mobile subscriber. Other actions include redirection to a top-up portal (subscriber interface that permits additional resource purchases), disconnection from the network, and forwarding to marketing for a subsequent solicitation. For example, business rules may provide that in a case where a subscriber has a history of multiple excessive events stored in subscriber state repository 260, less favorable options are made available to that subscriber. Adaptive fair usage module 210 also includes subscriber state repository 260, which stores historical subscriber event records and which may be used by rules engine 250. In addition or alternatively, event records may be produced and stored in subscriber state repository 260 for potentially later use in the evaluation of a subsequent customer usage situation. Accordingly, business rules and therefore corrective actions may be based on one or more prior instances of excessive usage.

Figure 4:
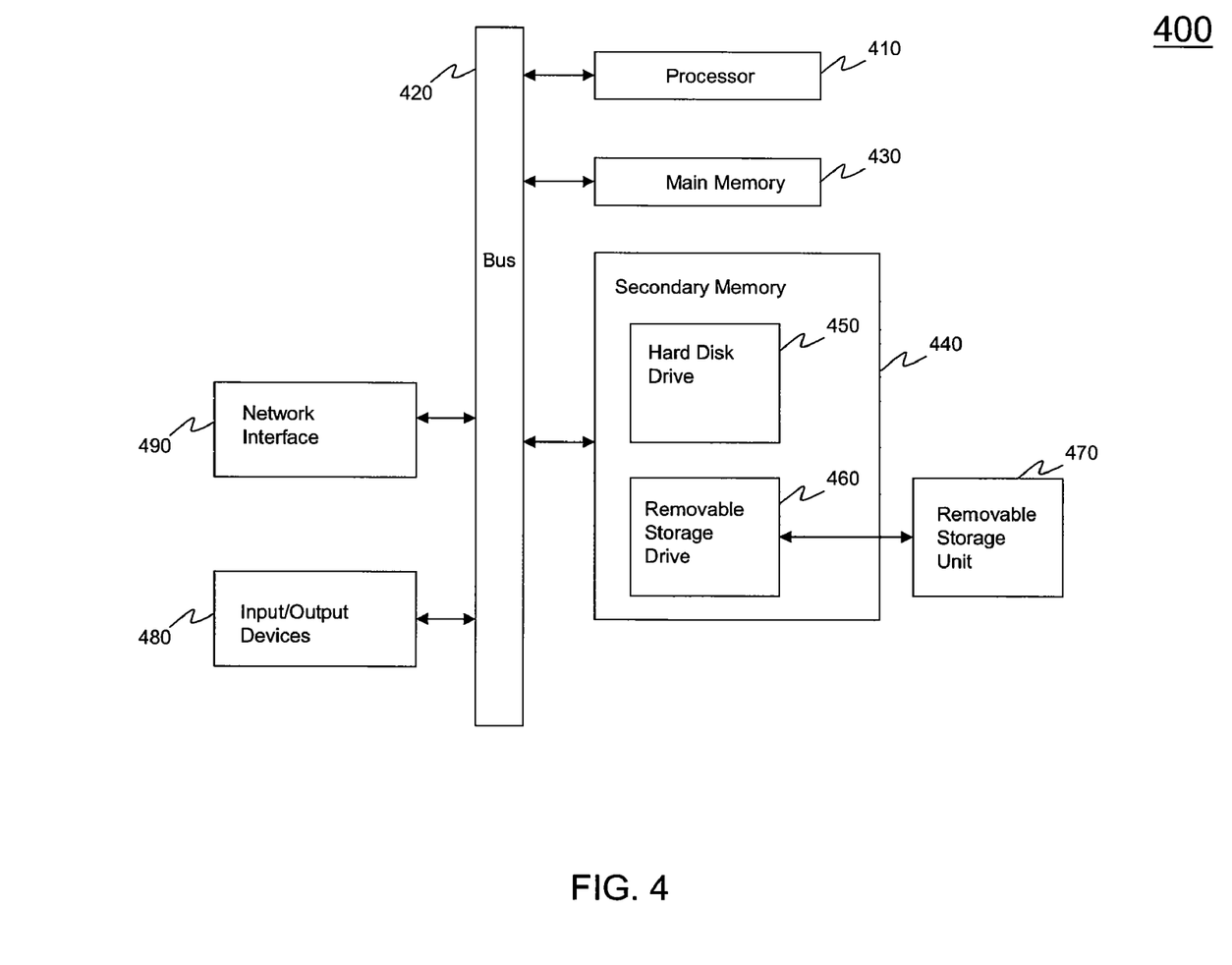
FIG. 4 is a diagram of a computer system on which the methods and systems herein described can be implemented, according to an embodiment of the invention.

In an embodiment of the present invention, adaptive fair usage module 210 can be implemented using a general purpose computer 400, with appropriate software so as to adapt general purpose computer 400. In an alternate embodiment, the adaptive fair usage module 210 is a state machine such that subscriber state information (e.g., prior usage events including prior excessive usage events, etc. stored in subscriber state repository 260) can be used in the application of a business rule. Such state information can be used to focus computational resources and follow-up actions on subscribers with a significant history. For example, a subscriber with a prior excessive usage event in a prior session will be provided with a reduced bandwidth immediately upon connection in a subsequent session by virtue of the available state history. Similarly, a subscriber with a prior excessive usage event in a given time period may face a larger bandwidth reduction upon a second excessive usage event than the bandwidth reduction appropriate to a first offender. Such a course of action takes advantage of the stored event history in subscriber session state repository 220. As noted earlier, subscriber state history is stored in subscriber state repository 260, and is accessible when needed by adaptive fair usage module 210.

In other embodiments, the adaptive fair usage module 210 may take into account non-usage subscriber characteristics to fashion its response to a usage situation. Such non-usage subscriber characteristics are stored in the subscriber profile repository 270, and are queried by adaptive fair usage module 210. For example, a premium subscriber would be flagged such that usage by such a subscriber (i.e., a subscriber who pays an elevated premium) is never deemed excessive by the adaptive fair usage module 210, irrespective of other factors at play.

Various embodiments of the adaptive fair usage module 210 seek to determine the two values (the usage value and the fair usage level threshold) using different approaches. With respect to the usage value, usage information is collected by the adaptive fair usage module 210 using the information reported in the accounting messages 230 that are transmitted between the PDSN 170 and the adaptive fair usage module 210. As noted above, an optional RADIUS server 280 or its equivalent is used as an intermediary such that RADIUS (or equivalent) messages may be exchanged with PDSN 170, while proprietary communications may be used between RADIUS server 280 and adaptive fair usage module 210.

If usage is deemed excessive (i.e., the usage value exceeds the fair usage level threshold), the adaptive fair usage module 210 (after executing the appropriate business rule) can communicate an action to the PDSN 170 using an AAA message 240 via optional RADIUS server 280. Such an AAA message may include a Change of Authorization (COA) message. As noted, various protocols may be used for the AAA message, including the well-known RADIUS and Diameter message protocols. Various other corrective actions are contemplated within the scope of the present invention. Moreover, such a corrective action may be static, e.g. the particular subscriber is automatically reduced in bandwidth. Alternatively, the corrective action may be operator configurable. For example, upon a first occurrence, the operator may alert the subscriber with a message. Subsequent occurrences may result in reduction in service bandwidth.

Figure 3:
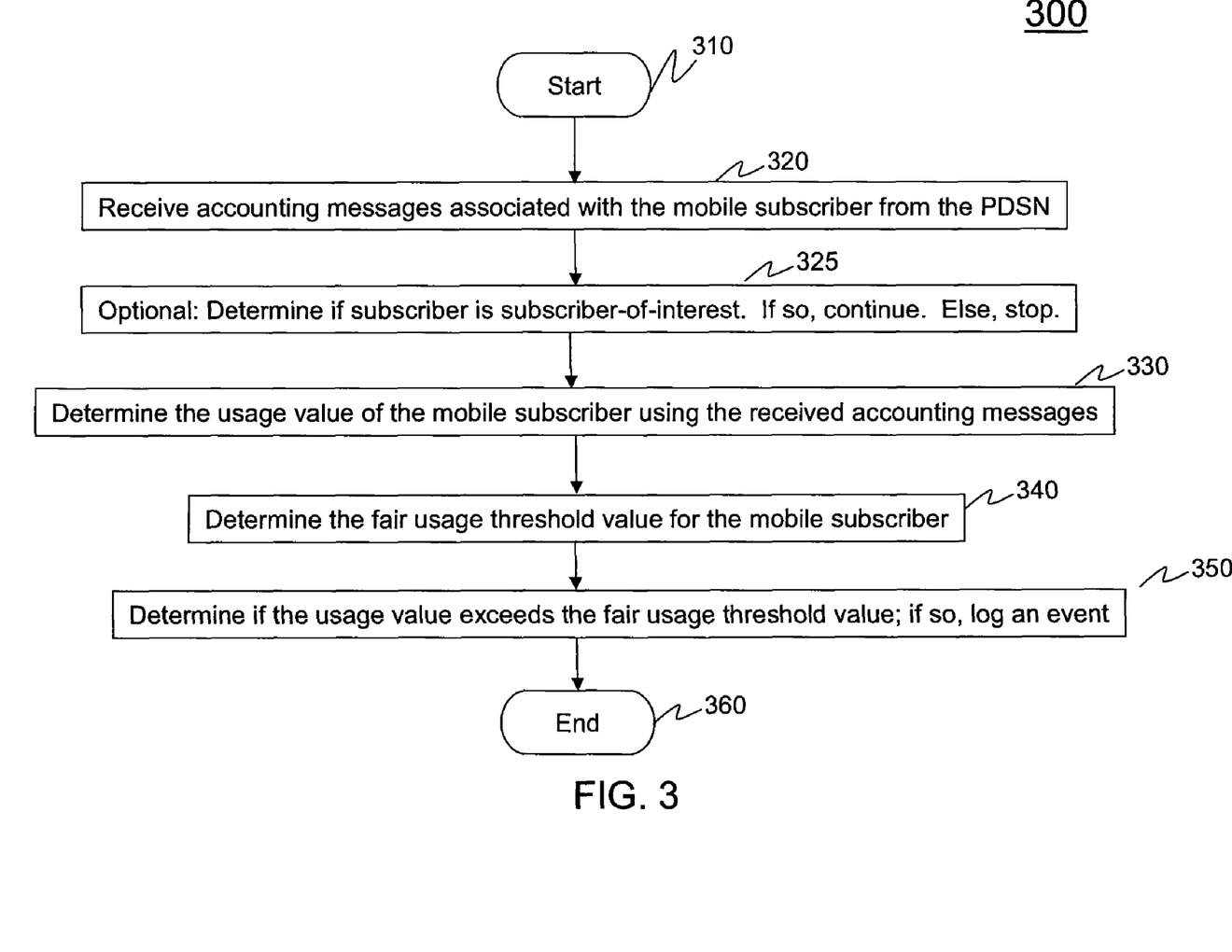
FIG. 3 depicts a flowchart of an exemplary method of excessive usage determination and control, according to embodiments of the present invention.

FIG. 3 depicts a flowchart 300 of an exemplary method for the adaptive fair usage module 210, according to embodiments of the present invention. FIG. 3 is described with continued reference to the operating environment of FIG. 2. However, method 300 is not limited to that embodiment. Method 300 begins at step 310.

In step 320, accounting messages associated with a subscriber are received from the PDSN (optionally via RADIUS server 280, as described above). In embodiments, an AAA protocol may be used for the accounting messages, including the commonly used AAA protocols such as RADIUS and Diameter. The accounting messages include a start accounting message, a stop accounting message and interim accounting messages. The start accounting message contains the subscriber's identifier, point of attachment and a unique session identifier. The stop accounting message contains final usage by the subscriber in terms of time, the number of packets transferred, the amount of data transferred and the reason for subscriber disconnect. The interim accounting messages contain data concerning the current session duration and current data usage.

In an optional step 325, the adaptive fair usage module 210 may determine those subscribers that are subscribers-of-interest. Although the adaptive fair usage module 210 may monitor all mobile subscribers, it can minimize the calculations performed by choosing to focus computational resources on only those subscribers that become subscribers-of-interest. A subscriber becomes a subscriber-of-interest by exceeding a separate subscriber-of-interest threshold value. For example, the subscriber-of-interest threshold value could be a level of bytes transferred over a given time period, or a cumulative level of bytes over a portion of a billing period. The subscriber-of-interest threshold value is stored in rules engine 250. By choosing to focus computational resources only on these subscribers-of-interest, this optional step 325 recognizes the reality that most mobile subscribers do not exceed acceptable usage parameters. Under this optional step 325, the method continues to step 330 for subscribers that are determined to be subscribers-of-interest. If a subscriber is determined not to be a subscriber-of-interest, the method ends.

In step 330, a usage value of the subscriber over a time period is determined using the received accounting messages. Such a usage value can be determined by a variety of techniques, including, but not limited to the cumulative method, the delta method, the total cumulative usage approach, and the total billing cycle usage method.

In the cumulative method, the adaptive fair usage module 210 determines the total number of bytes that have been transferred (either upload, download, or both) to the mobile subscriber. Such a determination is made by using the session duration and data usage information contained in the interim accounting messages received in step 320. Through the use of the subscriber's identifier in the accounting messages, adaptive fair usage module 210 keeps track of subscriber usage across multiple accounting messages.

In the delta method, the adaptive fair usage module 210 determines the total number of bytes that have been transferred during the period between the current point in time and the arrival of the immediately preceding accounting message arrival. Such a determination is made by using the session duration and data usage information contained in the interim accounting messages received in step 320.

In the total cumulative usage approach, the adaptive fair usage module 210 adds the total number of bytes that have been transferred during the current session to the total bytes transferred during the previous session usage. Such a determination is made by using the session duration and data usage information contained in the interim accounting messages received in step 320.

In the total billing cycle usage method, the adaptive fair usage module 210 determines the total number of bytes that have been transferred (either upload, download, or both) over a given billing cycle. Such a determination is made by using the session duration and data usage information contained in the interim accounting messages received in step 320 over the relevant billing cycle. In this method, the total number of bytes resets to zero at the beginning of each billing cycle.

The choice of the time period over which the usage value is computed warrants scrutiny. Care must be taken to ensure that the time period is not too small. In the case of too short a time period, the usage calculated would be more representative of the bursty nature of the data protocol, rather than a reliable representation of the long term usage profile of the particular mobile subscriber. A time period of 20 minutes would eliminate the bursty artifacts of the 3G data protocols, while still allowing for the detection of excessive usage and providing a response thereto, such that the majority of mobile subscribers enjoy a pleasant experience.

In step 340, a fair usage threshold value for the subscriber is determined. Such a usage value can be determined by a variety of techniques, including, but not limited to, a static pre-configured value, values associated with the time of day, a real time value based on the known data carrying capacity, and a fixed subscriber-attribute value.

The fair usage threshold value can also be computed using a number of different methods. For example, one method is to select the fair usage threshold value based on a static pre-configured value using such relevant factors as the network system design, prior experience for an existing system, etc. The static pre-configured value is stored in the rules engine 250. This method is simple, but is not particularly flexible.

A second method is to select the fair usage threshold value based on a predetermined set of values that are appropriate to the time of day. In a roaming subscriber case, the time zone and roaming location where the actual usage occurs are also relevant. As in the first method, the predetermined set of value may be based on prior experience for an existing system, including its traffic patterns in the morning, afternoon and evening. This second method is more flexible since it takes in account the different loading conditions that exist on a typical network over a 24-hour period. It should be noted that this approach allows the outcome for a roaming subscriber to be biased differently from that which would result from a similarly situated subscriber in their home area. As before, the predetermined set of values for this approach are stored in the rules engine 250.

A third approach is to compute the fair usage threshold value in real time based on the known data carrying capacity for a base station coverage area. In this approach, the known data carrying is stored in the rules engine 250. Using the known data carrying capacity, the fair usage threshold value is determined by dividing that capacity by the number of active mobile subscribers using the same specific geographic coverage area at the time of calculation. To determine the number of active mobile subscribers, the adaptive fair usage module 210 makes a database query to the subscriber session state repository 220, requesting the number of mobile subscribers in active session with the particular base station ID. Note that the known data carrying capacity can be less than the theoretical capacity. For example, rules-of-thumb or simulations based on queuing theory may result in a known data carrying capacity choice that is less than the theoretical capacity due to the statistical nature of subscriber usage.

This third approach does have the drawback that it requires a recalculation at any time the number of subscribers changes. In a further embodiment of the present invention, the recalculation burden can be simplified by initiating a recalculation of the fair usage threshold value when the increase or decrease in the number of active mobile subscribers exceeds a predetermined value. Such a simplification is particularly attractive when the number of active mobile subscribers attaching and disconnecting from the network is particularly high.

It should be noted that more complex computations can be used to derive a fair usage threshold value based on the real-time population of active subscribers. For example, different subscribers may be given a priority weighting and thereby be entitled to a larger fractional of the total bandwidth in the base station coverage area.

Finally, a fourth method of establishing the fair usage threshold value is to use a fixed value that is supplied by the wireless network operator as a subscriber-attribute during the initial provisioning of service for that mobile subscriber. In this method, the subscriber-attribute is stored in the subscriber profile repository 270 and accessed by the adaptive fair usage module 210 when required.

In step 350, a determination is made if the usage value exceeds the fair usage threshold value, and if so, a business rule in rules engine 250 is executed. A business rule may result in simply logging the excessive usage in subscriber state repository 260. Other business rules include taking action, such as alerting the mobile subscriber to the excessive usage, taking corrective action against the mobile subscriber or both. For example, a corrective action may be to reduce the bandwidth made available to the mobile subscriber. Other actions include redirection to a top-up portal, disconnection from the network, and forwarding the subscriber to marketing for a subsequent solicitation. Certain business rules may base their resulting actions on one or more instances of prior excessive usage, as well as the current excessive usage. For example, a subscriber with a history of multiple excessive events stored in subscriber state repository 260 may see less favorable options than that provided to a similarly situated subscriber session without the excessive usage history. Other business rules may use non-usage subscriber attributes (e.g., premium class subscribers) to deem that usage by such a class of subscribers as never being excessive.

Still referring to step 350, in making a determination of excessive usage, the time intervals associated with the two values should be comparable. For example, if the cumulative session method is used for usage value calculation and the fair usage threshold value is a fixed subscriber-attribute, then the time over which the usage is collected needs to be taken into account. For example, if the fair usage threshold value is 2 MBps and the time frame over which the usage is collected is 20 minutes, then the usage value calculated needs to be divided by 1200 seconds before a comparison is made with the fair usage threshold value.

As noted above, a mobile subscriber usage is deemed excessive if the usage exceeds the fair usage threshold. Once usage has been deemed excessive by the adaptive fair usage module 210, a business rule is triggered. As noted earlier, business rules include the possibility of taking action against the subscriber. Such an action would be communicated by the adaptive fair usage module 210 to the PDSN 170 via an AAA message 240b (optionally using a RADIUS server that generates AAA message 240b from message 240a). Various actions are contemplated within the scope of the present invention. Such an action may be static, e.g. the particular subscriber is automatically reduced in bandwidth. Alternatively, the business rule and subsequent action may be operator configurable. For example, upon a first occurrence, the operator may alert the subscriber with a message. Subsequent occurrences may result in reduction in service bandwidth.

Method 300 ends at step 360.

In a further embodiment of the current invention, a mobile subscriber whose prior usage has been deemed excessive may be provided an opportunity to resume nominal service with the wireless provider. In such a case, the usage of the subscriber would continue to be monitored and were such usage to fall below a re-establish threshold value, then nominal service would be restored. Care would need to be taken in choosing the value of the fair usage threshold value and the re-establish threshold value so that hysteresis effects would not surface.

Persons of ordinary skill in the relevant art(s) will recognize that the scope of the embodiments of the present invention is not limited to a wireless communications system. In particular, embodiments of the present invention can be used in a wired communications system where subscriber utilization of a shared bandwidth is in contention and where one or more subscribers undertake excessive usage of the shared resource. In addition, embodiments of the present invention are not limited to 3G wireless communications protocols. For the same reason as noted above, other embodiments of the present invention are equally applicable to communications networks using other communications protocols where shared resources are in contention by a number of subscribers such that excessive usage may result.

Computer System Implementation

Computer 400 includes one or more processors (also called central processing units, or CPUs), such as processor 410. Processor 410 is connected to communication bus 420. Computer 400 also includes a main or primary memory 430, preferably random access memory (RAM). Primary memory 430 has stored therein control logic (computer software), and data.

Computer 400 may also include one or more secondary storage devices 440. Secondary storage devices 440 include, for example, hard disk drive 450 and/or removable storage device or drive 460. Removable storage drive 460 represents a floppy disk drive, a magnetic tape drive, a compact disk drive, an optical storage device, tape backup, ZIP drive, JAZZ drive, etc.

Removable storage drive 460 interacts with removable storage unit 470. As will be appreciated, removable storage unit 460 includes a computer usable or readable storage medium having stored therein computer software (control logic) and/or data. Removable storage drive 460 reads from and/or writes to the removable storage unit 470 in a well known manner.

Removable storage unit 470, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 400, or multiple computer 400s to perform any combination of the functions described herein.

Computer programs (also called computer control logic) are stored in main memory 430 and/or the secondary storage devices 440. Such computer programs, when executed, direct computer 400 to perform the functions of the present invention as discussed herein. In particular, the computer programs, when executed, enable processor 410 to perform the functions of the present invention. Accordingly, such computer programs represent controllers of the computer 400.

Computer 400 also includes input/output/display devices 480, such as monitors, keyboards, pointing devices, etc.

Computer 400 further includes a communication or network interface 490. Network interface 490 enables computer 400 to communicate with remote devices. For example, network interface 490 allows computer 400 to communicate over communication networks, such as LANs, WANs, the Internet, etc. Network interface 490 may interface with remote sites or networks via wired or wireless connections. Computer 400 receives data and/or computer programs via network interface 490.

The invention can work with software, hardware, and operating system implementations other than those described herein. Any software, hardware, and operating system implementations suitable for performing the functions described herein can be used.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Conclusion

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The breadth and scope of the present invention should not be limited by any of the above-described exemplary embodiments, but should be defined only in accordance with the following claims and their equivalents.

What is claimed is:

1. An apparatus, comprising:
  an adaptive fair usage module configured to:
    determine a data usage value for a mobile subscriber over a defined time period in a base station coverage area using accounting messages exchanged between a Packet Data Serving Node (PDSN) and an adaptive fair usage module;
    determine a fair usage threshold value for the subscriber in the base station coverage area;
    compare the data usage value for the subscriber in the base station coverage area and the fair usage threshold value for the subscriber in the base station coverage area; and
    execute a business rule if the data usage value for the subscriber in the base station coverage area exceeds the fair usage threshold value for the subscriber in the base station coverage area;
    wherein the fair usage threshold value is based, in part, on a response from a real-time session database, and wherein the response is indicative of a number of active users of a base station associated with the base station coverage area.

2. The apparatus of claim 1, wherein the business rule includes the logging of an event.

3. The apparatus of claim 1, wherein the usage value is determined based on at least one of a total number of bytes transferred to the mobile subscriber, a total number of bytes transferred to the mobile subscriber between a current point in time and an arrival of an immediately preceding accounting message, a total number of bytes transferred to the mobile subscriber including bytes for a prior session, and a total number of bytes transferred to the mobile subscriber during a current billing cycle.

4. The apparatus of claim 1, wherein the adaptive fair usage module is further configured to:
  perform a corrective action if the usage value exceeds the fair usage threshold value.

5. A method for ensuring fair data usage for subscribers, comprising:
  determining a data usage value for a mobile subscriber over a defined time period in a base station coverage area using accounting messages exchanged between a Packet Data Serving Node (PDSN) and an adaptive fair usage module;
  determining a fair usage threshold value for the subscriber in the base station coverage area;
  comparing the data usage value for the subscriber in the base station coverage area and the fair usage threshold value for the subscriber in the base station coverage area; and
  executing a business rule, if the data usage value for the subscriber in the base station overage area exceeds the fair usage threshold value for the subscriber in the base station coverage area;
  wherein the fair usage threshold value is based, in part, on a response from a real-time session database, and wherein the response is indicative of a number of active users of a base station associated with the base station coverage area.

6. The method of claim 5, wherein the determining the data usage value includes determining a total number of bytes transferred to the mobile subscriber.

7. The method of claim 5, wherein the determining the data usage value includes determining a total number of bytes transferred to the mobile subscriber between a current point in time and an arrival of an immediately preceding accounting message.

8. The method of claim 5, wherein the determining the data usage value includes determining a total number of bytes transferred to the mobile subscriber including bytes for a prior session.

9. The method of claim 5, wherein the determining the data usage value includes determining by a total number of bytes transferred to the mobile subscriber during a current billing cycle.

10. The method of claim 5, wherein the determining the fair usage threshold value includes querying the real-time session database to receive the number of active users serviced by the based station associated with base station coverage area.

11. A non-transitory computer program product comprising a computer useable medium including control logic stored therein, the control logic comprising:
  determining a data usage value for a mobile subscriber over a defined time period in a base station coverage area using accounting messages exchanged between a Packet Data Serving Node (PDSN) and an adaptive fair usage module;
  determining a fair usage threshold value for the subscriber in the base station coverage area;
  comparing the data usage value for the subscriber in the base station coverage area and the fair usage threshold value for the subscriber in the base station coverage area; and
  executing a business rule, if the data usage value for the subscriber in the base station coverage area exceeds the fair usage threshold value for the subscriber in the base station coverage area;
  wherein the fair usage threshold value is based, in part, on a response from a real-time session database, and wherein the response is indicative of a number of active users of a base station associated with the base station coverage area.

12. The computer program product of claim 11, wherein determining a usage value includes determining a total number of bytes transferred to the mobile subscriber.

13. The computer program product of claim 11, wherein determining a usage value includes determining a total number of bytes transferred to the mobile subscriber between a current point in time and an arrival of an immediately preceding accounting message.

14. The computer program product of claim 11, wherein determining a usage value includes determining a total number of bytes transferred to the mobile subscriber including bytes for a prior session.

15. The computer program product of claim 11, wherein determining a usage value includes determining by the adaptive fair usage module a total number of bytes transferred to the mobile subscriber during a current billing cycle.

16. The method of claim 5, where in the business rules stored in the rules engine are configurable by a network operator.

17. The method of claim 5, where in the business rules stored in the rules engine are re-directs for the subscriber to a top-up portal that allows the subscriber to purchase additional resources.

18. The method of claim 5, further comprising: an intermediary server for exchange of messages between the PDSN and the adaptive fair usage module.

19. The apparatus of claim 1, wherein the accounting messages exchanged between the PDSN and the adaptive fair usage module that are used to determine the data usage value for a mobile subscriber over a defined time period relate to a single session established for the mobile subscriber include:
   at least one interim accounting message with respect to a start accounting message and a stop accounting message, which contains an identifier of the mobile subscriber and an indication of a current duration of the session and current data usage during the current duration of the session;
   wherein the start accounting message contains the identifier of the mobile subscriber, a point of attachment, and a unique session identifier for the session;
   wherein the stop accounting message contains the identifier of the mobile subscriber, a total data usage value by the mobile subscriber during the session and a reason for a disconnection of the session.

20. The apparatus of claim 1, wherein the fair usage threshold value is calculated by dividing a known data carrying capacity for the base station coverage area by the number of active users indicated by the response of the real-time session database.

21. The apparatus of claim 1, wherein the fair usage threshold value is re-calculated only in response to an increase or a decrease in the number of active users exceeding a predetermined value.

\* \* \* \* \*